United States Patent [19]

Maresca et al.

[11] Patent Number: 4,788,248

[45] Date of Patent: Nov. 29, 1988

[54] THERMOPLASTIC RESINS AND POLYAMIDES COMPATIBILIZED WITH POLYAMIDE-POLYARYLATE BLOCK COPOLYMERS

[75] Inventors: Louis M. Maresca; Sheldon J. Shafer, both of Pittsfield, Mass.

[73] Assignee: General Electric Company, Pittsfield, Mass.

[21] Appl. No.: 117,746

[22] Filed: Nov. 4, 1987

[51] Int. Cl.$^4$ .............................................. C08L 77/00
[52] U.S. Cl. ...................................... 525/66; 525/67; 525/425; 525/432; 525/433
[58] Field of Search .................... 525/66, 67, 92, 146, 525/166, 179, 425, 433, 426, 432, 902

[56] References Cited

FOREIGN PATENT DOCUMENTS 0227053 7/1987 European Pat. Off. .
1069862 4/1986 Japan .

Primary Examiner—Theodore E. Pertilla
Attorney, Agent, or Firm—Hedman, Gibson, Costigan & Hoare

[57] ABSTRACT

Thermoplastic blends of polyamide with at least one resin selected from the group consisting of polycarbonate, poly(ester carbonate) and polyarylate are compatibilized with an effective amount of a polyamide-polyarylate block copolymer and molded into articles having excellent physical properties with little or no evidence of delamination.

21 Claims, No Drawings

THERMOPLASTIC RESINS AND POLYAMIDES COMPATIBILIZED WITH POLYAMIDE-POLYARYLATE BLOCK COPOLYMERS

CROSS-REFERENCE TO RELATED APPLICATIONS

This application is related to the following commonly assigned patent applications:

| SER. NO. | FILED | TITLE | APPLICANTS | STATUS |
|---|---|---|---|---|
| 812,433 | 12/23/85 | THERMOPLASTIC BLENDS WITH AMORPHOUS POLYAMIDE | L. M. Maresca D. C. Clagett U. S. Wascher | Pending |
| 117,250 | | AMIDE-ARYLATE COPOLYMERS AND PROCESS | D. C. Clagett D. W. Fox L. M. Maresca S. J. Shafer | |

FIELD OF THE INVENTION

The present invention relates to compatibilized thermoplastic resin blends containing a polyamide resin and a polycarbonate, poly(ester carbonate) or polyarylate resin. More particularly, the present invention relates to thermoplastic resin blends containing an amorphous polyamide resin and at least one resin selected from the group of polycarbonate, poly(ester carbonate) or polyarylate and, as a compatibilizer, a polyamidepolyarylate block copolymer.

BACKGROUND OF THE INVENTION

Polycarbonates, poly(ester carbonates), and polyarylates are well known thermoplastic materials which due to their many advantageous physical properties, find use as thermoplastic engineering materials in many commercial and industrial applications. These resins, for example, exhibit excellent properties of toughnes, flexibility, impact strength, and heat resistance. All such resins may generally be prepared by the reaction of a dihydric phenol, such as bisphenol-A, with a carbonate precursor and/or an aromatic dicarboxylic acid or a reactive derivative thereof.

These resins, have been commonly blended with other resins to produce blends having various modified properties. For example, blends of these resins with a second and even third thermoplastic resin can lead to blends which not only have the above mentioned properties but additionally have excellent properties for which polycarbonate, poly(ester carbonate), and polyarylate may not otherwise be recognized, such as chemical resistance, hydrolytic stability, resistance to brittle failure, processability and gas barrier properties.

For some important applications, i.e., automotive parts, it is important that such resins have enhanced chemical resistance to aggressive solvents, for example acetone, aromatic solvents, gasoline, and the like, to a degree which may not be necessary in most other applications. In the above mentioned application Ser. No. 812,433 it is disclosed that the necessary levels of solvent resistance in combination with excellent levels of other necessary properties are achieved by use of certain novel blends of polycarbonate, poly(ester carbonate), or polyarylate with polyamide. There is, however, in some cases a tendency for the molded articles to delaminate, possibly due to a lack of compatibility between the resin phases.

In the above mentioned application Ser. No. 117,250 block copolymers comprising polyamide segments and polyarylate segments are disclosed to be useful per se as molding resins, as packaging materials and as blending resins with other thermoplastics.

Such polyamide-polyarylate block copolymers now, surprisingly, have been found to significantly improve the compatibility of blends of polyamides with polycarbonates, poly(ester carbonates) or polyarylates. Molded articles containing an effective amount of the polyamide-polyarylate block copolymer have much less tendency to delaminate and they exhibit high notched Izod impact values, especially in rubber modified versions. The block copolymers for use in this invention can be prepared either from the monomers, or from terminally-reactive polymers, respectively.

The present invention, therefore, produces blends containing polyamides and polycarbonate, poly(ester carbonate), or polyarylate which otherwise exhibit the desirable properties of such resins including in some cases, transparency, but which also exhibit excellent solvent resistance, ductility, and resistance to brittle failure without evidence of incompatibility.

SUMMARY OF THE INVENTION

Briefly, according to the present invention, there are provided polyamide blends with polycarbonates, poly(ester carbonates), or polyarylates compatibilized with polyamide-polyarylate block copolymers, having unexpectedly improved properties, i.e., solvent resistance, ductility, and resistance to brittle failure and resistance to delamination. The compatibilized thermoplastic resin compositions comprise
(i) at least one resin selected from the group consisting of polycarbonate, poly(ester carbonate) or polyarylate;
(ii) a polyamide resin; and
(iii) an effective compatibilizing amount of a polyamide-polyarylate block copolymer.

In a preferred embodiment, the compatibilized composition will also include
(iv) an effective, impact improving amount of a rubbery impact modifier.

When the polyamide resin is crystalline, best results are obtained when the block copolymer contains crystalline polyamide segments. When the polyamide resin is amorphous, best results are obtained when the block copolymer contains amorphous segments.

DETAILED DESCRIPTION OF THE INVENTION

Polycarbonate resins suitable for use herein can be prepared by reacting a dihydric phenol with a carbonate precursor, such as phosgene, a haloformate or a carbonate ester. Generally speaking, such carbonate polymers may be typified as possessing recurring structural units of the formula:

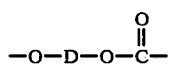

wherein D is a divalent aromatic radical of the dihydric phenol emloyed in the polymer producing reaction. Preferably, the carbonate polymers used to provide the resinous mixtures of the invention have an intrinsic viscosity (as measured in methylene chloride at 25° C.) ranging from about 0.30 to about 1.00 dl/g. The dihydric phenoss which may be employed to provide such aromatic carbonate polymers are mononuclear or polynuclear aromatic compounds, containing as functional groups two hydroxy radicals, each of which is attached directly to a carbon atom of an aromatic nucleus. The preferred polycarbonate resin for use herein is a homopolymer derived from 2,2-bis(4-hydroxyphenyl)propane and a carbonate precursor.

These aromatic polycarbonates can be manufactured by known processes, such as, for example and as mentioned above, by reacting a dihydric phenol with a carbonate precursor, such as phosgene, in accordance with methods set forth in U.S. Pat. Nos. 4,018,750 and 4,123,436; or by transesterification processes such as are disclosed in U.S. Pat. No. 3,154,008, as well as other processes known to those skilled in the art.

Poly(ester carbonate) resins suitable for use herein may generally be described as polymers comprising recurring carbonate groups,

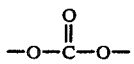

carboxylate groups,

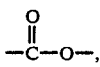

and aromatic carbocyclic groups in the linear polymer chain, in which at least some of the carboxylate groups and at least some of the carbonate groups are bonded directly to ring carbon atoms of the aromatic carbocyclic groups. These poly(ester carbonate) polymers in general, are prepared by reacting an aromatic dicarboxylic acid or ester forming derivative, a dihydric phenol and a carbonate precursor.

The preparation of poly(ester carbonates) which may be employed in the compositions of the present invention is described in U.S. Pat. Nos. 3,030,331; 3,169,121; 3,207,814; 4,194,038 and 4,156,069 incorporated herein by reference.

The poly(ester carbonates) which are preferred in the practice of the present invention include the aromatic poly(ester carbonates) derived from dihydric phenols, aromatic dicarboxylic acids or their reactive ester forming derivates such as the aromatic diacid halides, and phosgene. A particularly useful class of aromatic poly(ester carbonates) is that derived from bisphenol-A, isophthalic acid, terephthalic acid, or a mixture of isophthalic acid and terephthalic acid, or the reactive derivatives of these acids such as terephthaloyl dichloride, isophthaloyl dichloride, or a mixture of isophthaloyl dichloride and terephthaloyl dichloride, and phosgene. The molar proportion of ester units in the poly(ester carbonate) is generally from about 25 to 90 mole percent and preferably about 35 to 80 mole percent. The molar range of terephthalate units, the remainder of the copolymer ester units preferably comprising isophthalate units, is generally from about 2 to 90 percent, and preferably from about 5 to about 25 percent.

Polyarylate resins suitable for use herein and aromatic polyesters containing carboxylate groups,

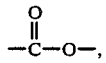

and aromatic carbocyclic groups in the linear polymer chain, in which at least some of the carboxylate groups join directly ring carbon atoms of the aromatic carbocyclic groups. The polyarylate polymers, in general, are prepared by reacting an aromatic dicarboxylic acid or ester forming derivative thereof, and a dihydric phenol. Of course, polyarylates may be polymerized from a carboxylic acid/hydroxy functional monomer in a head-tail arrangement.

A preferred polyarylate contains a dihydric phenol and an aromatic dicarboxylic acid. The preferred carboxylic acid portion contains from about 95 to 0 mole percent of terephthalic acid and from about 5 to about 100 mole percent of isophthalic acid. More preferably, such polyarylates contain a mixture of from about 30 to about 70 mole percent terephthalic acid and from about 70 to about 30 mole percent of isophthalic acid. A polyarylate containing a mixture of 50 mole percent of terephthalic acid and 50 mole percent isophthalic acid is common. In general, these and other suitable polyarylates have a reduced viscosity of from about 0.4 to about 1.0 as measured in p-chlorophenol at 40° C. (0.2 g/100 ml).

The polyarylates of the present invention can be prepared by any of the well known prior art polyester forming reactions, such as the reaction of the acid chlorides of the aromatic dicarboxylic acids with the dihydric phenol, the reaction of the diaryl esters of the aromatic dicarboxylic acids with the dihydric phenols, and the reaction of the aromatic diacids with diester derivates of dihydric phenol. These processes are described in, for example, U.S. Pat. Nos. 3,317,464; 3,948,856; 3,780,148; 3,824,213 and 3,133,898.

Typical dihydric phenols useful in formulating the polycarbonate, polyester carbonate, or polyarylate resins as described above may be represented by the general formula:

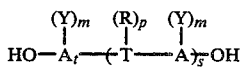

in which A is an aromatic group such as phenylene, biphenylene, naphthlene, anthrylene, etc. T may be an alkylene or alkylidene group such as methylene, ethylene, propylene, propylidene, isopropylidene, butylene, butylidene, isobutylidene, amylene, isoamylene, amylidene, isoamylidene, and generally from 1 to 12 carbon atoms, inclusive, etc. Where T is an alkylene or alkylidene group, it may also consist of two or more alkylene or alkylidene groups, connected by a non-alkylene or non-alkylidene group, such as an aromatic linkage, a tertiary amino linkage, an ether linkage, a carbonyl linkage, a silicon-containing linkage, or by a sulfur-containing linkage such a sulfide, sulfoxide, sulfone, etc. In addition, T may be a cycloaliphatic group of 5 to 7 carbon atoms, inclusive, e.g., cyclopentyl, cyclohexyl, or a cycloalkylidene of five to seven carbon atoms, inclusive, such as cyclohexylidene; a sulfur-containing linkage, such as sulfide, sulfoxide or sulfone; an ether linkage; a carbonyl group; a direct bond; a tertiary nitrogen group; or a silicon-containing linkage such as silane or siloxy. Other groups with T may represent will occur to those skilled in the art. R is hydrogen or a monovalent hydrocarbon group such as alkyl of 1 to 8 carbon atoms, inclusive, e.g., methyl, ethyl, propyl, etc.; aryl of from 6 to 20 carbon atoms, inclusive, e.g., phenyl, naphthyl, etc.; arylalkyl of from 7-20 carbon atoms inclusive, e.g., benzyl, ethylphenyl, etc.; or cycloaliphatic of 5 to 7 carbon atoms, inclusive, e.g., cyclopentyl, cyclohexyl, etc. Y may be an inorganic atom such as chlorine, bromine, fluorine, etc; a group such as the nitro group, nitrile group etc.; an organic group such as R above; or an oxy group such as OR, it being only necessary that Y be inert to and unaffected by the reactants and the reaction conditions. The letter m is any whole number from and including zero through the number of positions on A available for substitution; p is any whole number from and including zero through the number of available positions on T; t is a whole number equal to at least one; and s is any whole number from and including zero to twenty.

In the typical dihydric phenol compound represented by the formula above, when more than one Y substituent is present, they may be the same or different. The same is true for the R substituent. Where s is greater than one, T can be the same or different. Where T is a direct bond, the aromatic rings are directly joined with no intervening alkylene or other bridge. The positions of the hydroxyl groups and Y on the aromatic nuclear residues, A, can be varied in the ortho, meta, or para positions; and the groupings can be in a vicinal, nonsymmetrical or symmetrical relationship, where two or more ring carbon atoms of the aromatic hydrocarbon residue are substituted with Y and a hydroxyl group.

Examples of dihydric phenol compounds that may be employed in the above polymers include:
2,2-bis-(4-hydroxyphenyl)propane, (bisphenol-A);
2,4'-dihydroxydiphenylmethane;
bis-(2-hydroxyphenyl)methane:
bis-(4-hydroxyphenyl)methane:
bis-(4-hydroxy-5-nitrophenyl)methane:
bis-(4-hydroxy-2,6-dimethyl-3-methoxyphenyl) methane;
1,1-bis-(4-hydroxyphenyl)ethane;
1,2-bis-(4-hydroxyphenyl)ethane;
1,1-bis-(4-hydroxy-2-chlorophenyl)ethane;
1,1-bis-(2,5-dimethyl-4-hydroxyphenyl)ethane;
1,3-bis-(3-methyl-4-hydroxyphenyl)propane;
2,2-bis-(3-phenyl-4-hydroxyphenyl)propane;
2,2-bis-(3-isopropyl-4-hydroxyphenyl)propane;
2,2-bis-(4-hydroxynaphthyl)propane;
2,2-bis-(4-hydroxyphenyl)pentane;
3,3-bis-(4-hydroxyphenyl)pentane;
2,2-bis-(4-hydroxyphenyl)heptane;
bis-(4-hydroxyphenyl)phenylmethane;
bis-(4-hydroxyphenyl)cyclohexylmethane;
1,2-bis-(4-hydroxyphenyl)-1,2-bis-(phenyl) propane;
2,2-bis-(4-hydroxyphenyl)-1-phenylpropane; and the like. Also included are dihydroxybenzenes typified by hydroquinone and resorcinol; dihydroxydiphenyls such as 4,4'-dihydroxydiphenyl; 2,2'dihydroxydiphenyl; 2,4'-dihydroxydiphenyl; dihydroxy-naphthalenes such as 2,6-dihydroxynaphthalene, etc.

Also useful are dihydric phenols wherein T is a sulfur-containing radical such as the dihydroxy aryl sulfones exemplified by: bis-(4-hydroxyphenyl)sulfone; 2,4'-dihydroxydiphenyl sulfone; bis(3,5-dimethyl-4-hydroxyphenyl)sulfone; 5'-chloro-2,4'dihydroxydiphenyl sulfone; 3-chloro-bis-(4-hydroxyphenyl) sulfone; and 4,4'dihydroxytriphenyldisulfone; etc. The preparation of these and other useful sulfones are described in U.S. Pat. No. 2,288,282. Hydroxy terminated polysulfones as well as substituted sulfones using halogen, nitrogen, alkyl radicals, etc., are also uesful.

Dihydroxy aromatic ethers such as those described in U.S. Pat. No. 3,148,172 are useful as the dihydric phenol herein. The dihydroxy aromatic ethers may be prepared as described in U.S. Pat. No. 2,739,171. Illustrative of such compounds are the following:
4,4'-dihydroxydiphenyl ether;
4,4'-dihydroxytriphenyl ether;
the 4,3'-, 4,2'-, 4,1'-, 2,2'-, 2,3'-, etc. dihydroxydiphenyl ethers;
4,4'-dihydroxy-2,6-dimethyldiphenyl ether;
4,4'-dihydroxy-2,5-dimethyldiphenyl ether;
4,4'-dihydroxy-3,3'-diisobutyldiphenyl ether;
4,4'-dihydroxy-3,3'-diisopropyldiphenyl ether;
4,4'-dihydroxy-3,3'-dinitrodiphenyl ether;
4,4'-dihydroxy-3,3'-dichlorodiphenyl ether;
3,3'-dihydroxy-3,3'-difluorodiphenyl ether;
4,4'-dihydroxy-2,3'-dibromodiphenyl ether;
6,6'-dihydroxydinaphthyl-2,2'-ether;
6,6'-dihydroxy-5,5'-dichlorodinaphthyl -2,2'-ether; 4,4'-dihydroxypentaphenyl ether;
4,4'-dihydroxy-2,6-dimethoxydiphenyl ether;
4,4'-dihydroxy-2,5-diethoxydiphenyl ether, etc.

Mixtures of the dihydric phenols can also be employed, and where dihydric phenol is mentioned herein mixtures of such materials are considered to be included. Other dihydric phenols which are suitable for the preparation of the above described polymers are disclosed in U.S. Pat. Nos. 2,999,835; 3,028,365; 3,334,154; 4,131,575.

In general, any aromatic dicarboxylic acid or its reactive derivative, such as acid halide or aryl esters, conventionally used in the preparation of polyesters, may be used for the preparation of the polyester carbonates or polyarylates described above. The aromatic dicarboxylic acids which may be used include the aliphatic-aromatic dicarboxylic acids, in addition to the wholly aromatic dicarboxylic acids. Of course, skilled practitioners will recognize that some small percentage by number of the dicarboxylic acid may be aliphatic dicarboxylic acid. However, the use of such aliphatic dicarboxylic acid should not be to such a degree that desirable characteristics associated with aromatic dicarboxylic acids are substantially reduced. The aromatic dicarboxylic acids or their reactive derivatives, such as the aromatic diacid halides or aryl esters, produce poly(ester carbonate) and polyarylate resins which are most useful from the standpoint of physical properties.

The aromatic dicarboxylic acids may be represented by the general formula:

wherein $R^1$ represents an aromatic radical such as phenylene, naphthylene, biphenylene, substituted phenylene, etc.; two or more aromatic groups connected through non-aromatic linkages such as those defined above; or a divalent aliphatic-aromatic hydrocarbon radical such as an arylalkyl or alkylaryl radical. For purposes of the present invention, the aromatic dicarboxylic acids or their reactive derivatives such as, for example, the acid halides or diphenyl esters, are preferred. Thus, in the preferred aromatic dicarboxylic acids, as represented above, $R^1$ is an aromatic radical such as phenylene, biphenylene, naphthylene, substituted phenylene, etc. Some non-limiting examples of suitable aromatic dicarboxylic acids which may be used in preparing the poly(ester carbonate) or polyarylate resins of the instant invention include phthalic acid, isophthalic acid, terephthalic acid, homophthalic acid, o-, m-, and p-phenylenediacetic acid, and the polynuclear aromatic acids such as diphenyl dicarboxylic acid, and isomeric naphthalene dicarboxylic acids. The aromatics may be substituted with Y groups in the same manner as the dihydric phenolic aromatics are substituted. Of course, these acids may be used individually or as mixtures of two or more different acids.

The carbonate precursor used above to produce the polycarbonate or polyester carbonate resins may be either a carbonyl halide, a carbonate ester, or a haloformate. The carbonyl halides which can be employed herein are carbonyl chlorides and carbonyl bromides. Typical of the carbonate esters are diphenyl carbonate, di(halophenyl)carbonates such as di(chlorophenyl) carbonate, di(bromophenyl)carbonate, di(trichlorophenyl) carbonate, di(tribromophenyl)carbonate, etc., di(alkylphenyl)carbonates such as di(tolyl)carbonate, di(naphthyl) carbonate, di(chloronaphthyl)carbonate, phenyltolyl carbonate, chloronaphthyl chlorophenyl carbonate, and the like. The haloformates suitable for use herein include bishaloformates of dihydric phenols such as bischloroformates of hydroquinone, etc., or glycols such as bis-haloformates of ethylene glycol, neopentyl glycol, polyethylene glycol, etc. While other carbonate precursors will occur to those skilled in the art, carbonyl chloride, also known as phosgene, is preferred.

The polyamides utilized as component (ii) in this invention can be crystalline, amorphous or semicrystalline.

Examples of polyamides contemplated to be useful in this invention include, but are not limited to, those having repeating units of a formula selected from the group

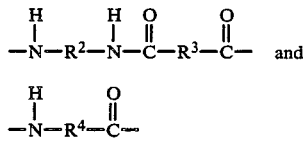 and

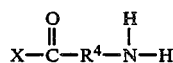

wherein $R^2$, $R^3$ and $R^4$ are the same or different divalent organic radicals selected from the group consisting of $C_2$-$C_{15}$ alkylene radicals, $C_3$-$C_{18}$ cycloalkylene radicals and $C_6$-$C_{20}$ arylene radicals. Mixed alkylene-cycloalkylene radicals or alkylene-arylene or arylene-alkylene radicals of $C_4$-$C_{30}$ are also considered to be within the scope of the terms "cycloalkylene" and "arylene", respectively.

These polyamides may be prepared by polymerization of a diamine having the formula

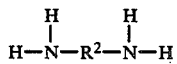

with a dicarbonyl compound such as dicarboxylic acids, esters or chlorides of the formula

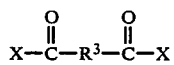

wherein X is chlorine, hydroxy, $C_1$-$C_6$ alkoxy or $C_6$-$C_{20}$ aryloxy and $R^2$ and $R^3$ are as defined above.

Typically, equimolar portions of the diamine and dicarboxylic acid are utilized. Slight departures from the equimolar proportions can be tolerated. Examples of suitable diamines include ethylenediamine, trimethylenediamine, tetramethylenediamine, pentamethylenediamine, hexamethylenediamine, octamethylenediamine, isomeric trimethylhexamethylenediamine, 2,2-bis(p-aminocyclohexyl)propane, bis(4-aminocyclohexyl)methane, bis(4-amino-3-methylcyclohexyl)methane, bis(4-aminophenyl)methane, meta-phenylenediamine, para-phenylenediamine, meta-xylylenediamine, para-xylylenediamine and the like.

Suitable dicarboxylic acids/esters include sebacic acid, suberic acid, glutaric acid, pimelic acid, adipic acid, terephthalic acid, isophthalic acid, and azelaic acid.

An alternative method for preparing the polyamides utilized in this invention is to polymerize monoamino-monocarbonyl compound of the formula:

$$X-\overset{O}{\underset{\|}{C}}-R^4-\overset{H}{\underset{|}{N}}-H$$

wherein X and $R^4$ are as defined above. Lactam structures for these monoamine-monocarboxylic acid may also be utilized. The lactam structures are ring structures formed by self-reaction of the amine and acid groups. Examples of these monoamino-monocarboxylic acids and acids and their lactams include: aminocaproic acid, butyrolactam, pivalolactam, caprolactam, capryllactam, enantholactam, undecanolactam, dodecanolactam, 3-aminobenzoic acid and 4-aminobenzoic acid. Mixtures of the lactams with diamines and dicarboxylic acids, and their derivatives will also produce polyamides suitable for this invention. Mixtures, random copolymers or block copolymers of two or more of the polyamides are within the scope of this invention also, as well as blends of crystalline and amorphous polyamides. Preferred polyamides include nylons 6, 6/6, 11, 12, 6/3, 4/6, 6/4, 6/9, 6/10 and 6/12. Also preferred combinations of diacid and diamine include terephthalic acid with trimethylhexamethylenediamine; isophthalic acid with trimethylhexamethylenediamine; adipic acid plus azelaic acid with 2,2-bis-(p-aminocyclohexyl)propane; terephthalic acid with bis(4-aminocyclohexyl)methane; isophthalic acid with hexamethylenediamine and terephthalic acid and isophthalic acid with hexamethylenediamine and combinations thereof.

Particular examples of polyamides suitable for the use in invention include, but are not limited to:

PACP-9/6, which is a 50:50 mole ratio copolymer of 2,2'-bis(4-aminocyclohexyl) propane and a 60/40 weight percent mixture of azelaic acid and adipic acid. A more detailed description of the preparation of this polymer is found in U.S. Pat. No. 3,840,501 which is incorporated herein by reference.

Zytel ® 330 and Selar PA, which are polyamides derived from hexamethylene diamine and mixtures of terephthalaic acid and isothalaic acid. These amorphous polyamides are available from E.I. duPont.

Gilamid ®TR 55, which is a polyamide derived from isophthalic acid/bis(4-amino-3-methylcyclohexyl) methane/lauryl lactam and is available from Emser Industries.

Trogamid ® T, which is derived from dimethyl terephthalate and a mixture of 2,2,4- and 2,4,4-trimethylhexamethylenediamine and is available from Dynamit Nobel.

It is also to be understood that the use of the term "polyamides" herein and in the appended claims is intended to include the toughened or super tough polyamides. Super tough polyamides, or super tough nylons, as they are more commonly known, are available commercially, e.g., from E.I. DuPont under the tradename Zytel®ST, or may be prepared in accordance with a number of U.S. Pat. Nos. including, among others, Epstein, 4,174,358; Novak, 4,474,927; Roura, 4,346,194; and Joffrion, 4,251,644. These super tough nylons are prepared by blending one or more polyamides with one or more polymeric or copolymeric elastomeric toughening agents. Suitable toughening agents are disclosed in the above-identified U.S. patents as well as in U.S. Pat. Nos., Caywood, Jr., 3,884,882, Swiger, 4,147,740 and Gallucci et al., "Preparation and Reactions of Epoxy-Modified Polyethylene", J. APPL. POLY. SCI., V. 27, pp. 425–437 (1982). Typically, these elastomeric polymers and copolymers may be straight chain or branched as well as graft polymers and copolymers, including core-shell graft copolymers, and are characterized as having incorporated therein either by copolymerization of by grafting on the preformed polymer, a monomer having functional and/or active or highly polar groupings capable of interacting with or adhering to the polyamide matrix so as to enhance the toughness of the polyamide polymer.

Crystalline polyamides for use herein are, invariably, highly crystalline with well-defined x-ray patterns. Amorphous polyamides for use herein are generally transparent with no distinct melting point, and the heat of fusion is about 1 cal/gram or less. The heat of fusion may be conveniently determined by use of a differential scanning calorimeter (DSC).

The polyamide-polyarate block copolymers have are of the general formula

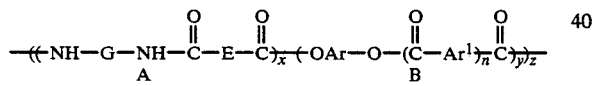

wherein repeating units A comprise an amorphous or crystalline polyamide constituting from about 1 to about 99 percent by weight of said block copolymer and repeating units B comprise a polyarylate constituting from about 99 to about 1 percent by weight of said block copolymer, where E is selected from divalent alkyl, aryl, cycloalkyl, arylalkyl and alkylaryl groups of from 1 to 30 carbon atoms or a mixture of any of the foregoing, optionally substituted with at least one chlorine, bromine, fluorine, nitro, nitrile, alkyl of from 1 to 6 carbon atoms, alkoxy of from 1 to 6 carbon atoms or aryl of from 6 to220 carbon atoms; G is a divalent alkyl, aryl, cycloalkyl, arylalkyl or alkylaryl group of from about 2 to about 30 carbon atoms or a mixture of any of the foregoing, optionally interrupted with alkylene, arylene, carbonyl, ether, amino or sulfur-containing groups, optionally substituted with at least one of chlorine, bromine, fluorine, nitro, nitrile, alkyl of from 1 to 6 carbon atoms, alkoxy of from 1 to 6 carbon atoms or aryl of from 6 to 20 carbon atoms; Ar and Ar¹ are, independently, divalent aromatic carbocyclic groups, optionally interrupted with alkylene, arylene, carbonyl, ether, amino, silicon-containing or sulfur-containing groups or mixtures of any of the foregoing such groups, optionally substitued with at least one of chlorine, bromine, fluorine, nitro, nitrile, alkyl of from 1 to 6 carbon atoms, alkoxy of from 1 to 6 carbon atoms, aryl of from 6 to 20 carbon atoms, or a mixture of any of such groups, n is 0 or 1 or both 0 and 1, and x, y and z are each integers of from 1 to 100,000. Preferably the block copolymers will have values of x and y of greater than about 15.

The block copolymers above defined, can be made from the monomers by a process comprising
(1) heating in a homogenous melt a mixture of at least one diaryl ester of a dicarboxylic acid of the formula

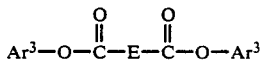

wherein Ar³ represents the same or different aromatic moiety of 6 to 20 carbon atoms, optionally substituted with at least one of chlorine, bromine, fluorine, nitro, nitrile, alkyl of from 1 to 6 carbon atoms, alkoxy of from 1 to 6 carbon atoms or aryl of from 6 to 20 carbon atoms and E is as above defined with an amine of the formula

wherein G is as above defined and R² is hydrogen or alkyl of from 1 to 10 carbon atoms and, in addition, when taken together the same as G; and
(2) adding to the product of step (1) a dihydric phenol of the formula

wherein Ar is as above defined and at least one diaryl ester of an aromatic dicarboxylic acid of the formula

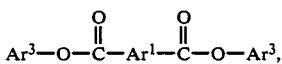

or a diaryl carbonate of the formula

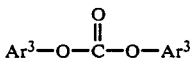

or a mixture thereof, wherein Ar¹ and Ar³ is as defined above and continuing the heating at a temperature above which a homogeneous melt is obtained and under reduced pressure until formation of said polyamide-polyarylate block copolymer is substantially complete.

Preferably, the diaryl ester used in step (1) comprises a diaryl terephthalate, a diaryl isophthalate, a diaryl adipate or a mixture thereof. Especially preferably, the diaryl ester will comprise diphenyl terephthalate, diphenyl isophthalate, diphenyl adipate or a mixture thereof. Preferably also, the diamine used in step (1) comprises ethylenediamine, trimethylenediamine, tetramethylenediamine, pentamethylenediamine, 2-methylpentamethylenediamine, hexamethylenediamine, isomeric trimethylhexamethylenediamine, meta-xylylenediamine paraxylylenediamine, 1,3-bis-(aminomethyl)cyclohexane, 1,4-bis (aminomethyl)cyclohexane, 1,3-diaminocyclohexane, 1,4-diaminocyclohexane, bis(4-aminocyclohexyl)methane, 2,2-bis (4aminocyclohexyl)propane, 1,4-piperazine, meta-phenylenediamine, para-phenylenediamine, bis(4- aminophenyl)methane and the like or a mixture of any of the foregoing. Preferably also, in step (2) the diaryl ester will comprise a diaryl terephthalate, a diaryl isophthalate or a mixture thereof, alone, or in further combination with a diaryl carbonate. Preferably the diaryl esters are diphenyl isophthalate and diphenyl terephthalate and the diaryl carbonate is diphenyl carbonate. Special mention is made of a process wherein the dihydric phenol in step (2) comprises bisphenol-A or a bisphenol-A substituted with chloro, bromo, fluoro, alkyl of 1 to 3 carbon atoms or a mixture of any of the foregoing. Preferably the dihydric phenol comprises bisphenol A.

Among the preferred block copolymers are those prepared in a two-step melt phase process by initially the amine-ester interchange reaction of either an excess of a diamine or a diaryl ester to produce a polyamide having either amine or aryl ester terminal groups and further reacting said polyamide with a dihydric phenol and a diaryl ester of an aromatic dicarboxylic acid, alone, or in further combination with a diaryl carbonate in a second step to form a polyamide-polyarylate block copolymer containing from about 1 to about 99 percent by weight of polyamide segments and from about 99 to about 1 percent by weight of polyarylate segments.

As will be demonstrated hereafter, the block copolymers can also be formed by reacting terminally-reactive polyamides with polyarylates or poly(estercarbonates) e.g., in an extruder.

Blends of polyamide resin with polycarbonate, poly(ester carbonate) or polyarylate and polyamidepolyarylate block copolymer in any proportion will at least in some degree exhibit characteristics embodying the present invention. However, as a practical matter, the benefits of such blend will not be measurably significant outside a weight ratio of from about 2 to about 98 percent by weight of said polyamide to about 98 to about 2 percent by weight of polycarbonate, poly(ester carbonate) or polyarylate content, and preferably from about 10 to about 90 percent by weight of the former to about 90 to about 10 percent by weight of the latter. An effective amount of block copolymer will generally comprise from about 10 to about 50 parts per hundred parts of (i) and (ii) combined.

Of course, the blends herein may contain other thermoplastic resins, various impact modifiers, stabilizers, flame retardants, mold release agents, reinforcing agents, pigments, and the like. Examples of other thermoplastic resins include poly(ether imides), polysulfones, polyphenylene oxides, and the like. Generally, such other thermoplastic resins should not constitute greater than 80% by weight of total thermoplastic content. Many additives are widely used and recognized as suitable for use herein.

Preferred embodiments of this invention include (iv) rubbery impact modifiers. A wide variety of impact modifiers are known to be useful for thermoplastic resin compositions, such as copolymers and interpolymers of rubbery diene and acrylate polymers, rubbery ethylene-propylene-diene terpolymers, styrene-ethylene-butylene-styrene block copolymers, methyl methacrylate-styrene-butadiene terpolymers, and the like.

Preferred impact modifiers contemplated for use in this invention are those known as core-shell graft copolymers which have a rubbery first stage, or core, and a hard, thermoplastic stage, or shell, grafted thereon. The rubber core may comprise (1) polymerized conjugated diene units of one or more conjugated dienes alone or (2) copolymerized conjugated dienes with units of a vinyl monomer or mixture of vinyl monomers or (3) polymerized acrylate monomers ($C_1$–$C_8$) alone or (4) copolymerized acrylate monomers ($C_1$–$C_8$) with other vinyl monomers.

Suitable conjugated dienes for use in said core phase include butadiene, isoprene, 1,3-pentadiene and the like. Illustrative of the vinyl monomers copolymerizable with the conjugated dienes include vinyl aromatic compounds such as styrene, alpha-methylstyrene, vinyl toluene, para-methylstyrene and the like; esters of acrylic and methacrylic acid, including for example methyl acrylate, ethyl acrylate, n-butyl acrylate, iso-butyl acrylate, methyl methacrylate and ethyl methacrylate; and unsaturated aliphatic nitriles such as acrylonitrile, methacrylonitrile and the like. Suitable acrylate monomers of 1-8 carbon atoms are the esters of acrylic acid and methacrylic acid given above. The acrylate monomers may be copolymerized with the vinyl aromatic compounds and unsaturated aliphatic nitriles also. The rubber core may also include a cross-linking monomer and/or a graft linking monomer, more particularly described below.

One preferred class of core-shell graft copolymers for use herein comprises a rubbery core of polybutadiene homopolymer or a styrene-butadiene copolymer having about 10 to 50% by weight styrene and about 90 to 50% by weight of butadiene, with a molecular weight of from about 150,000 to about 500,000. Another class of preferred core-shell graft copolymers, comprises greater than 75% by weight acrylate monomers, with n-butyl acrylate most being preferred.

The rigid, thermoplastic shell of the copolymer comprises polymerized units of (1) a, monoalkenyl arene alone or (2) a monoalkenyl arene copolymerized with one or more other vinyl monomers wherein at least 10 mole percent of the graft component is derived from the monalkenyl arene monomers, or (3) polymerized acrylate ($C_1$–$C_{16}$) monomers alone or (4) copolymerized acrylate monomers ($C_1$–$C_{16}$) with other vinyl monomers. Preferred monalkenyl arene monomers are styrene, alpha-methylstyrene, para-methylstyrene and the like, most preferably styrene. The vinyl monomers that may be copolymerized with the monoalkenyl arene monomers in an amount up to 90 mole % include (a) the esters of acrylic and methacrylic acid such as, for example, ethyl acrylate, methyl acrylate, butyl acrylate, methyl methacrylate, ethyl methacrylate, butyl methacrylate and the like; (b) unsaturated aliphatic nitriles such as acrylonitrile and methacrylonitrile and (c) vinyl halides such as vinyl chloride and vinyl bromide. The acrylate monomers suitable for use in providing the thermoplastic shell include the esters of acrylic and methacrylic acid given above. The preferred monomers are $C_1$–$C_{14}$ alkyl methacrylates such as butyl methacrylate. The vinyl halides and unsaturated aliphatic nitriles are also suitable monomers for copolymerization with the acrylate monomers.

Preferred thermoplastic shells are those derived from polymerized units of styrene and methyl methacrylate wherein each is present in an amount ranging from 10 to 90 mole %. Another preferred class is that which comprises 50-100 weight % $C_1$–$C_4$ alkyl methacrylate. Additionally, these shells may also have copolymerized therewith a minor amount, preferably less than 10 mole % of one or more of the other aforementioned vinyl monomer units. As with the core, the shell phase may also include a cross-linking monomer or graft linking monomer as discussed more fully below.

Optionally, the core-shell graft copolymers may further comprise one or more cross-linked or non-cross-linked intermediate layers or phases between the core and shell which is grafted to the rubber core and upon which the final thermoplastic shell is grafted. These intermediates are comprised of one or more polymerized vinyl monomers. Suitable vinyl monomers for one of these intermediate layers include but are not limited to those mentioned above, especially styrene. Typically 75% to 100% styrene is used to form the intermediate stage or layer. Where such intermediate layers are present in the core-shell copolymer and are derived from at least 10 mole % of a monoalkenyl arene monomer, the final phase of shell may comprise up to and include 100 mole % monomer units which are not monoalkenyl arene units such as the acrylate monomers described above, and provide an acceptable impact modifier. Especially preferred in such instances are multi-phase copolymers wherein the intermediate phase comprises polystyrene and the final or outer thermoplastic shell comprises poly(methyl methacrylate).

As mentioned above, each of the individual stages of the core-shell graft copolymers may contain a cross-linking monomer and/or a graft linking monomer. As the cross-linking agent for use in preparation of the core-shell graft copolymers, those which copolymerize smoothly with the monomer in the respective stages of the reaction should be selected. These are generally polyethylenically unsaturated monomers having a plurality of double bonds all of which polymerize at substantially the same rate. Representative crosslinking agents include, but are not limited to aromatic polyfunctional vinyl compounds such as divinyl benzene, trivinyl benzene, divinyl toluene and the like and polyacrylic or polymethacrylic esters (di- and trimethacrylates or acrylates) of polyols represented by monoethylene-, diethylene- and triethylene glycols, 1,3-butanediol such as butylene diacrylate, trimethylol propane triacrylate, dimethyl acrylate, vinyl acrylate, and vinyl methacrylate.

A graft-linking monomer may also be incorporated into each stage at a weight percent of 0.1 to 5 based on the monomer charge. The graft linking monomer is also a polyethylenically unsaturated monomer having a plurality of double bonds. However, at least one of these double bonds polymerizes at a different rate from the other unsaturated groups. These graft linking monomers provide a residual level of unsaturation in the latter stages of a polymerization and consequently, at or near the surface of the elastomeric particle. Glycerin allyl esters of unsaturated aliphatic carboxylic acids such as allyl acrylate, allyl methacrylate and the like are the preferred graft linking monomers. Diallyl and triallyl compounds such as diallyl phthalate, diallyl sebacate, triallyltriazine and the like are also suitable. While the amount of cross-linking agent employed is from about 0.01 to 5.0% by weight based on the monomer charge for each stage of the reactions, generally, the total amount of cross-linking agent in the final graft copolymer will preferably be less than 3.0 weight percent.

The core-shell graft copolymers suitable for use herein generally comprise from about 25 to about 95 weight percent of the core and from about 5 up to 75 weight percent of the graft or shell phase. Where an intermediate phase or layer is present in the graft copolymer, the shell and intermediate phase will each comprise from about 5 to about 25 weight percent of the copolymer.

The core-shell graft copolymers for use in the present invention are prepared by the conventional method of emulsion polymerization. However, in an alternative method, graft copolymerization may be carried out after suitable coagulating the latex of cross-linked trunk polymer so as to adjust the size of the latex particles of the trunk polymer.

Also, during polymerization, the monomeric components used in the graft copolymerization may be brought into reaction in one step, or in multiple steps while supplying them in proportions to obtain a ratio suitable for blends of the present invention.

Specific examples of suitable core-shell graft copolymers and the production thereof are disclosed, for example, in U.S. Pat. Nos. 4,180,494, 4,022,748 and 4,292,233. Commercially available graft core-shell copolymers for use herein include the Acryloid® KM653, KM330, KM611, 8522XP and 8538XP from Rohm and Haas Chemical Company and Geloy® from General Electric Company. Acryloid® KM330 has a poly(butyl acrylate) core and a poly(ethyl methacrylate) shell. Acryloid® KM653 has a polybutadiene core and a poly(methyl methacrylate) shell. Acryloid® 8538XP and Acryloid® KM 8522XP have polybutadiene cores and poly(methyl methacrylate) shells. These two (2) impact modifiers additionally contain heat stablilizers. Geloy® ASA has a poly(butyl acrylate) core and a cross-linked polystyrene-polyacrylonitrile shell and intermediate layer.

The quantity of rubbery impact modifier (iv) can be present in all proportions. However, to obtain the most useful blends, it is preferable to maintain the concentration of impact modifier at less than 40 percent by weight, based on total resinous components (i) to (iv), inclusive. Concentrations of from 5 to 30 weight percent impact modifier provide a significant enhancement in impact modifier strength without a significant loss to other desirable physical properties of the blend, such as heat distortion temperature. Concentrations below 5 percent by weight can be expected to have an enhancing effect on impact strength but at levels which correspond to the low concentration. The most preferred concentrations fall within the range of about 5 to 25 weight percent.

The thermoplastic blends of the present invention are simply prepared by standard techniques; for example, by simple melt blending or dry mixing and melt extruding at an elevated temperature. The extruded admixture is then molded into a piece of specific dimensions or further extruded into a film or sheet product.

DESCRIPTION OF SPECIFIC EMBODIMENTS

Further illustration of this invention is set forth in the following examples. There is no intention to limit the scope of the invention to merely what is shown.

EXAMPLE 1

(a) Polyamide-Polyarylate Block Copolymer from Monomers

A 4CV Helicone mixer was charged with 487.1 g (1.53 moles) of diphenyl isophthalate and 174.3 g (1.50 moles) of hexamethylenediamine and blanketed with nitrogen. Agitation was started and the temperature was raised to 180° C.–185° C. After 45 minutes the reaction temperature was increased to 200° C.-205° C. and held there for 30 minutes prior to adding 318.3 g (1.00 moles) of diphenyl isophthalate, 232.9 g (1.02 moles) of bisphenol A and 2.14 g (0.01 moles) of diphenyl carbonate. A 1.0 ml portion of a solution of 184 mg of LiOH.H$_2$O in 100 ml of water was added 15 minutes later and the reaction temperature gradually increased to 245° C.-250° C. After 30 minutes at 245° C.-250° C. a vacuum was pulled on the system to remove byproduct phenol. The pressure was gradually decreased from 125 mm of Hg to less than 2 mm of Hg over a 1 hour period while the temperature was increased to 280° C.-285° C. These conditions were maintained for 1.5 hours before the vacuum was broken and the polymer discharged and allowed to cool to room temperature. The resulting block copolymer was tough and had an intrinsic viscosity (IV) as measured in phenol/tetrachlorethane (60/40) of 0.59 dl/g.

(b) Preparation of Compatibilized Blend

A polycarbonate/nylon blend (50/50 weight %) was prepared by melt blending 500 g of poly(bisphenol-A carbonate), LEXAN® 131, General Electric Company, 500 g of poly (hexamethylene-iso/terephthalamide) Zytel® 330 E.I. duPont and 300 g of the polyamide-polyarylate block copolymer of step (a), in a Werner Pfleiderer ZSK 30mm twin screw extruder at barrel temperatures ranging from 565° F.-585° F. The resins were dried for at least 6 hours at 110° C. in an air circulating oven prior to extrusion. The resulting pelletized product was redried under similar conditions before molding into ASTM test specimens on a 3 oz., 70 ton, Newbury injection molding machine at 500° F.-525° F. Mechanical properties were measured according to standard ASTM test procedures and the results are summarized in Table 1.

COMPARATIVE EXAMPLE A

Example 1 step (b) was repeated except that the LEXAN® 131 and Zytel® 330 blend did not contain any of the block copolymer described in Example 1, step (a). Mechanical properties for this material are also shown in Table 1.

EXAMPLE 2

The procedure of Example 1, step (b) was repeated, except that the concentration of polyamidepolyarylate block copolymer was increased to 400 g (40 parts by weight based on 100 parts by weight of polyamide and polycarbonate combined) and 280 g, (20 parts by weight based on all three thermoplastic components) of an interpolymer having a rubbery polybutadiene core and a styrene-methyl methacrylate shell, ACRYLOID®KM 653, Rohm & Haas Co., as an impact modifier was added. The mechanical properties of articles molded from this blend are summarized in Table 1.

COMPARATIVE EXAMPLE B

The procedure of Example 2 was repeated except that the blend did not contain any of the block copolymer described in Example 1, step (a). Mechanical properties for this material are also shown in Table 1.

TABLE 1

Compositions Comprising Polyamide-Polycarbonate and Block Copolymer of Polyamide-Polyarylate

| Properties | A* | 1 | B* | 2 |
|---|---|---|---|---|
| Tensile Strength (Kpsi) | | | | |
| Yield | 11.5 | 12.1 | 9.1 | 9.3 |
| Break | 6.3 | 8.6 | 6.9 | 7.3 |
| Tensile Modulus (Kpsi) | 364.4 | 277.6 | 295.3 | 349.5 |
| Elongation (%) | | | | |
| Yield | 6.3 | 6.2 | 6.2 | 5.7 |
| Break | 47.1 | 43.0 | 74.3 | 43.6 |
| Notched Izod (ft-lb/in) | 2.0 | 1.4 | 3.3 | 10.0 |
| HDT (F°) @ 66 psi | 264.4 | 261.0 | 250.9 | 265.7 |
| Delamination | Yes | No | Yes | No |

*Comparative
a - Based on observations of tensile specimens after testing

Relative to the comparative examples, the compositions of Examples 1 and 2 showed little or no delamination during tensile testing, indicating a high degree of compatibility.

EXAMPLES 3-5

(a) Polyamide-Polyarylate Block Copolymers from Polymers

A series of polyamide-polyarylate block copolymers were prepared by extruding 1400 g of a given nylon with 400 g of a poly(bisphenol-A iso/terephthalate) ARDEL® D-100, Union Carbide Corp., on a Werner Pfleiderer ZSK 30 mm twin screw extruder at 460° F.-520° F. All resins were dried for at least 6 hours at 110° C. in a air circulating oven prior to extrusion. The nylons used include poly(hexamethylene iso/terephthalamide) Zytel® 330 E.I. duPont, (Example 3), poly(trimethylhexamethylene terephthalamide), Trogamid® T, Dynamit Nobel (Example 4), and a polyamide comprising units derived from isophthalic acid, bis(4-amino-3-methylcyclohexyl)methane and lauryl lactam, Grilamid® TR55, Emser Industries (Example 5).

(b) Preparation of Compatibilized Blends

Three impact modified polycarbonate-polyamide containing blends were prepared by melt blending 900 grams of the respective block copolymers of step (a) and 280 g of ACRYLOID®KM653 rubbery impact modifier with 500 g. of poly(bisphenol-A carbonate), LEXAN 131, in a Werner Pfleiderer ZSK 30mm twin screw extruder at 460° F.-520° F. The polycarbonate blend and block copolymer components were dried for at least 6 hours at 110° C. in an air circulating oven prior to extrusion. Subsequently, the resulting pellets were redried under similar conditions and molded into ASTM specimens using a 3 oz., 70 ton Newbury injection molding machine at 550° F. Mechanical properties for these blends are shown in Table 2.

COMPARATIVE EXAMPLES C-E

A series of impact modified poly(bisphenol-A carbonate)-nylon blends was prepared by melt blending 500 g of General Electric Co. LEXAN® 131, resin, 500 g of a given nylon and 200 g (20 phr based on total weight of engineering thermoplastic components) of rubbery impact modifier ACRYLOID® KM653 in a Werner Pfleiderer ZSK 30 mm twin screw extruder at 460° F.-520° F. The nylons used were Zytel® 330 (Comparative Example C), Trogamid® T (Comparative Example D) and Grilamid®TR55 (Comparative Example E). The polycarbonate and polyamide components were dried for at least 6 hours at 110° C. in an air circulating oven prior to extrusion. Subsequently the resulting pellets were redried under similar conditions and molded into ASTM specimens using a 3 oz, 70 ton Newbury injection molding machine at 550° F. Mechanical properties for these blends are shown in Table 2.

COMPARATIVE EXAMPLES F-H

Comparative Examples C-E were repeated except 200 g of polyarylate Ardel®D-100, Union Carbide, was added to the formulation and the concentration of nylon and impact modifier KM653 were increased to 700 g and 280 g respectively. Comparative Examples F, G and H contained Zytel®330, Trogamid®T and Grilamid®TR55 respectively as the nylon component. Mechanical properties for these blends are summarized in Table 2.

(b) Preparation of Compatibilized Blends

Three impact modified polycarbonate-polyamide containing blends were prepared by melt blending 900 grams of the respective block copolymers of step (a) and 280 g of ACRYLOID® KM653 rubbery impact modifier with 500 g of poly(bisphenol-A carbonate) LEXAN 131) in a Werner Pfleiderer ZSK 30 mm twin screw extruder at 460° F.-520° F. The polycarbonate and block copolymer components were dried for at least 6 hours at 110° C. in an air circulating oven prior to extrusion. Subsequently, the resulting pellets were re-dried under similar conditions and molded into ASTM specimens using a 3 oz, 70 ton Newbury injection molding machine at 550° F. Mechanical properties for these blends are shown in Table 3.

COMPARATIVE EXAMPLES I-K

A series of impact modified poly(bisphenol-A carbonate)-nylon blends was prepared by melt blending

TABLE 2

Compositions Comprising Polyamide, Polycarbonate, Polyarylate and Polyamide-Polyarylate Block Copolymers

| Properties | C* | D* | E* | F* | G* | H* | 3 | 4 | 5 |
|---|---|---|---|---|---|---|---|---|---|
| Tensile Strength (Kpsi) | | | | | | | | | |
| Yield | 9.1 | 7.1 | 7.8 | 9.0 | 8.0 | 8.0 | 8.9 | 8.2 | 8.0 |
| Break | 5.1 | 6.9 | 7.4 | 8.4 | 7.4 | 6.5 | 8.2 | 7.0 | 7.0 |
| Tensile Modulus (Kpsi) | 327.7 | 315.7 | 286.5 | 309.0 | 309.2 | 265.8 | 312.6 | 322.9 | 261.6 |
| Elongation (%) | | | | | | | | | |
| Yield | 5.5 | 5.1 | 6.3 | 5.9 | 6.0 | 6.3 | 5.7 | 6.2 | 6.2 |
| Break | 74.9 | 9.0 | 87.0 | 79.4 | 64.9 | 27.6 | 72.4 | 44.8 | 68.9 |
| Notched Izod (ft-lb/in) | 1.7 | 0.7 | 3.3 | 3.8 | 1.5 | 2.7 | 7.3 | 9.4 | 15.1 |
| Delamination[a] | Yes | Yes | Yes | Yes | Yes | Yes | No | No | No |
| Polyamide used | (1) | (2) | (3) | (1) | (2) | (3) | (1) | (2) | (3) |

*Comparative examples
[a]Based on observations of tensile specimens after testing
(1) Poly(hexamethylene iso/terephthalamide), Zytel 330, E. I. duPont
(2) Poly(trimethylhexamethylene terephthalamide), Trogamid T, Dynamit Nobel
(3) Polyamide from bis(4-amino-3-methylcyclohexyl)methane, isophthalic acid and lauryl lactam, Grilamid TR55, Emser Industries When comparing blends with the same nylon component from Comparative Examples C-H and Examples 7-9 the products in accordance with this invention containing the block copolymer exhibited significantly higher notched Izod impact strength and less delamination.

EXAMPLES 6-8

(a) Polyamide-Polyarylate Block Copolymers from Polymers

A series of polyamide-poly(ester carbonate) block copolymers were prepared by extruding 1400 g of a given nylon with 400 g of a poly(bisphenol-A carbonate iso/terephthalate) LEXAN®4701, General Electric Company, on a Werner Pfleiderer ZSK 30mm twin screw extruder at 460° F. All resins were dried for at least 6 hours at 110° C. in an air circulating oven prior to extrusion. The nylons used include poly(hexamethylene iso/terephthalamide) Zytel® 330, E.I. duPont, (Example 6), poly(trimethylhexamethylene terephthalamide), Trogamid® T, Dynamit Nobel (Example 7), and a polyamide comprising units derived from isophthalic acid, bis(4-amino-3-methylcyclohexyl)methane and lauryl lactam, Grilamid®, TR55, Emser Industries (Example 8).

500 g of LEXAN 131 resin General Electric Company, 500 g of a given nylon and 200 g (20 phr based on total weight of engineering thermoplastic components) of rubbery impact modifier ACRYLOID KM653 in a Werner Pfleiderer ZSK 30 mm twin screw extruder at 460° F.-520° F. The nylons used were Zytel 330 (Comparative Example I), Trogamid T (Comparative Example J) and Grilamid TR55 (Comparative Example K). The polycarbonate and polyamide components were dried for at least 6 hours at 110° C. in an air circulating oven prior to extrusion. Subsequently the resulting pellets were re-dried under similar conditions and molded into ASTM specimens using a 3oz, 70 ton Newbury injection molding machine at 550° F. Mechanical properties for these blends are shown in Table 3.

COMPARTIVE EXAMPLES L-N

Comparative Examples I-K were repeated except 200 g of poly(ester carbonate), LEXAN 4701, General Electric Company, was added to the formulation and the concentration of nylon and impact modifier KM653 were increased to 700 g and 280 g respectively. Comparative Examples L, M and N contained Zytel 330, Trogamid T and Grilamid TR55 respectively as the nylon component. Mechanical properties for these blends are summarized in Table 3.

The above mentioned patents and applications and publications are incorporated herein by reference.

Many variations will suggest themselves to those skilled in this art in light of the foregoing detailed description. For example, instead of poly(bisphenol-A carbonate), a poly(bisphenol-A carbonate, iso-terephthalate) can be used. All such obvious variations are variations within the full intended scope of the appended claims.

TABLE 3

Compositions Comprising Polyamide, Polycarbonate, Poly(Ester Carbonate) and Polyamide-Poly(Ester Carbonate-Poly(Ester Carbonate) Block Copolymers

| Properties | Examples | | | | | | | | |
|---|---|---|---|---|---|---|---|---|---|
| | I* | J* | K* | L* | M* | N* | 6 | 7 | 8 |
| Tensile Strength (Kpsi) | | | | | | | | | |
| Yield | 9.1 | 7.1 | 7.8 | 9.1 | 7.7 | 8.3 | 9.1 | 8.6 | 7.9 |
| Break | 5.1 | 6.9 | 7.4 | 7.8 | 7.1 | 6.9 | 8.8 | 7.1 | 6.6 |
| Tensile Modulus (Kpsi) | 327.7 | 315.7 | 286.5 | 308.6 | 326.7 | 264.2 | 315.1 | 323.3 | 255.6 |
| Elongation (%) | | | | | | | | | |
| Yield | 5.5 | 5.1 | 6.3 | 5.8 | 5.1 | 6.5 | 5.7 | 6.2 | 6.6 |
| Break | 74.9 | 9.0 | 87.0 | 96.6 | 16.2 | 64.9 | 99.2 | 47.6 | 54.8 |
| Notched Izod (ft-lb/in) | 1.7 | 0.7 | 3.3 | 2.0 | 1.0 | 3.7 | 3.6 | 12.2 | 21.6 |
| Delamination$^a$ | Yes | Yes | Yes | Yes | Yes | Yes | No | No | No |
| Polyamide used | (1) | (2) | (3) | (1) | (2) | (3) | (1) | (2) | (3) |

*Comparative examples
$^a$Based on observations of tensile specimens after testing
(1) Poly(hexamethylene iso/terephthalamide), Zytel 330, E. I. duPont
(2) Poly(trimethylhexamethylene terephthalamide), Trogamid T, Dynamit Nobel
(3) Polyamide from bis(4-amino-3-methylcyclohexyl)methane, isophthalic acid and lauryl lactam, Grilamid TR55, Emser Industries

We claim:
1. A compatibilized thermoplastic resin composition comprising:
   (i) at least one resin selected from the group consisting of aromatic polycarbonate, poly(ester carbonate) or polyarylate;
   (ii) a polyamide resin; and
   (iii) an effective compatibilizing amount of a polyamide-polyarylate block copolymer.
2. A compatibilized composition as defined in claim 1 including (iv) an effective, impact improving amount of a rubbery impact modifier.
3. A composition as defined in claim 1 wherein said at least one resin is an aromatic polycarbonate.
4. A composition as defined in claim 1 wherein said at least one resin is a poly(ester carbonate).
5. A composition as defined in claim 1 wherein said at least one resin is a polyarylate.
6. A composition as defined in claim 1 which comprises from about 2 to about 98 percent by weight of polyamide to from about 98 to about 2 percent by weight of aromatic polycarbonate, poly(ester carbonate), polyarylate or a mixture per combined weight of (i) and (ii).
7. A composition as defined in claim 6 wherein (i) comprises from about 90 to 10 percent by weight to 10 to 90 percent by weight of (ii) per combined weight of (i) and (ii).
8. A composition as defined in claim 1 wherein said polyamide contains structural units of the formulae

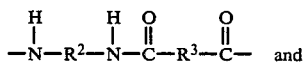 and

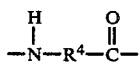

wherein $R^2$, $R^3$ and $R^4$ are the same or are different divalent organic radicals selected from the group consisting of $C_2$-$C_{15}$ alkylene radicals, $C_3$-$C_{18}$ cycloalkylene radicals and $C_6$ to $C_{20}$ arylene radicals.

9. A composition as in claim 8 wherein said polyamide is prepared by polymerization of
   (a) a diamine of the formula

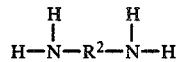

with a dicarbonyl compound of the formula

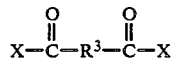

wherein X is Cl, OH, $C_1$-$C_6$ alkoxy or $C_6$-$C_{20}$ aryloxy; or
   (b) a monoamino-monocarbonyl compound of the formula

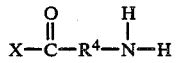

wherein X is Cl, OH, $C_1$-$C_6$ alkoxy or $C_6$ or $C_6$-$C_{20}$ aryloxy; or
   (c) a lactam structure of the monoaminomonocarbonyl compound of (b); or
   (d) a combination of (a), (b) and (c).
10. A composition as defined in claim 8 wherein said polyamide is obtained by polymerization of aminocaproic acid, butyrolactam, pivalolactam, caprolactam, capryllactam, enanthrolactam, undecanolactam, dodecanolactam, 3-aminobenzoic acid and 4-aminobenzoic acid or a mixture of any of the foregoing.
11. A composition as defined in claim 8 wherein said polyamide is obtained by polymerization of a diamine selected from ethylenediamine, trimethylenediamine, tetramethylenediamine, pentamethylenediamine, 2-methylpentamethylenediamine, hexamethylenediamine, isomeric trimethylmethylenediamine, meta-xylylenediamine, para-xylylenediamine, 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, 1,4-piperazine, meta-phenylenediamine, para-phenylenediamine, bis(4-aminophenyl)methane and the like or a mixture of any of the foregoing, with a dicarboxylic acid selected from sebacic acid, suberic acid, glutaric acid, pimelac acid, adipic acid, terephthalic acid, isophthalic acid, azelaic acid or a mixture of any of the foregoing.

12. A composition as defined in claim 11 wherein said polyamide is obtained by polymerization of
(a) terephthalic acid with trimethylhexamethylenediamine; or
(b) isophthalic acid with trimethylhexamethylenediamine; or
(c) adipic acid and azelaic acid with 2,2-bis (aminocyclohexyl) propane, or
(d) terephthalic acid with bis(4-aminocyclohexyl) methane; or
(e) isophthalic acid or adipic acid with hexamethylene diamine; or
(f) terephthalic acid/isophthalic acid with hexamethylene diamine.

13. A composition as defined in claim 1 wherein said polyamide is a copolymer of at least one nylon selected from the group consisting of nylon 6, 6/6, 11, 12, 6/3, 4/6, 6/4, 6/9, 6/10 and 6/12.

14. A composition as defined in claim 1 wherein said polyamide-polyarylate block copolymer (iii) is of the general formula

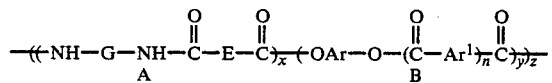

wherein repeating units A comprise an amorphous or crystalline polyamide constituting from about 1 to about 99 percent by weight of said block copolymer and repeating units B comprise a polyarylate constituting from about 99 to about 1 percent by weight of said block copolymer, where E is selected from divalent alkyl, aryl, cycloalkyl, arylalkyl and alkylaryl groups of from 2 to 30 carbon atoms or a mixture of any of the foregoing, optionally substituted with at least one chlorine, bromine, fluorine, nitro, nitrile, alkyl of from 1 to 6 carbon atoms, alkoxy of from 1 to 6 carbon atoms or aryl of from 6 to 20 carbon atoms; G is a divalent alkyl, aryl, cycloalkyl, arylalkyl or alkylaryl group of from about 2 to about 30 carbon atoms or a mixture of any of the foregoing, optionally interrupted with alkylene, arylene, carbonyl, ether, amino or sulfur-containing groups, optionally substituted with at least one of chlorine, bromine, fluorine, nitro, nitrile, alkyl of from 1 to 6 carbon atoms, alkoxy of from 1 to 6 carbon atoms or aryl of from 6 to 20 carbon atoms; Ar and $Ar^1$ are, independently, divalent aromatic carbocyclic groups, optionally interrupted with alkylene, arylene, carbonyl, ether, amino, silicon-containing or sulfurcontaining groups or mixtures of any of the foregoing such groups, optionally substituted with at least one of chlorine, bromine, fluorine, nitro, nitrile, alkyl of from 1 to 6 carbon atoms, alkoxy of from 1 to 6 carbon atoms, aryl of from 6 to 20 carbon atoms, or a mixture of any of such groups, n is 0 or 1 or both 0 and 1, and x, y and z are each integers of from 1 to 100,000.

15. A composition as defined in claim 1 wherein component (iii) comprises from about 10 to about 50 parts by weight per 100 parts by weight of components (i) and (ii) combined.

16. A composition as defined in claim 1 wherein the polyamide-polyarylate block copolymer component (iii) comprises the reaction product obtained by heating a diaryl ester of a dicarboxylic acid with a diamine in a first stage followed by adding a dihydric phenol and a diaryl ester of an aromatic diacid in a second stage.

17. A composition as defined in claim 1 wherein the polyamide-polyarylate block copolymer component (iii) comprises the reaction product obtained after melt processing a terminally-reactive polyamide and a polyarylate.

18. A composition as defined in claim 2 which also includes in effective amount of (iv) a rubbery impact modifier comprising a polybutadiene core and methyl methacrylate shell.

19. A molded article comprising a composition as defined in claim 1.

20. A molded article comprising a composition as defined in claim 2.

21. A composition as defined in claim 1 wherein the polyamide-polyarylate block copolymer component (iii) comprises the reaction product obtained after melt processing a terminally-reactive polyamide and a poly(ester-carbonate).

* * * * *